US011222159B2

(12) United States Patent
Kalte et al.

(10) Patent No.: US 11,222,159 B2
(45) Date of Patent: Jan. 11, 2022

(54) METHOD, COMPUTER-BASED SYSTEM AND COMPUTER PROGRAM PRODUCT FOR PLANNING PARTITIONS FOR A PROGRAMMABLE GATE ARRAY

(71) Applicant: dSPACE digital signal processing and control engineering GmbH, Paderborn (DE)

(72) Inventors: Heiko Kalte, Paderborn (DE); Dominik Lubeley, Paderborn (DE)

(73) Assignee: dSPACE digital signal processing and control engineering GmbH, Paderborn (DE)

(*) Notice: Subject to any disclaimer, the term of this patent is extended or adjusted under 35 U.S.C. 154(b) by 0 days.

(21) Appl. No.: 17/178,787

(22) Filed: Feb. 18, 2021

(65) Prior Publication Data

US 2021/0256190 A1 Aug. 19, 2021

(30) Foreign Application Priority Data

Feb. 18, 2020 (EP) ..................... 20157861

(51) Int. Cl.
| | |
|---|---|
| G06F 30/30 | (2020.01) |
| G06F 30/392 | (2020.01) |
| G06F 30/34 | (2020.01) |
| G06F 30/347 | (2020.01) |
| G06F 30/337 | (2020.01) |
| G06F 30/343 | (2020.01) |

(52) U.S. Cl.
CPC .......... *G06F 30/392* (2020.01); *G06F 30/337* (2020.01); *G06F 30/34* (2020.01); *G06F 30/343* (2020.01); *G06F 30/347* (2020.01)

(58) Field of Classification Search
CPC .............................................. G06F 30/00–398
See application file for complete search history.

(56) References Cited

U.S. PATENT DOCUMENTS

| 8,082,138 B1* | 12/2011 | Bakshi | ................. G06F 30/327 703/14 |
| 9,870,440 B2* | 1/2018 | Kalte | .................... G06F 30/34 |

OTHER PUBLICATIONS

L.-R. Hu et al., "A new hyper-graph partitioning for 3D-FPGA," 2018 14th IEEE Int'l Conference on Solid-State and Integrated Circuit Technology (ICSICT), 3 pages. (Year: 2018).*

(Continued)

*Primary Examiner* — Leigh M Garbowski
(74) *Attorney, Agent, or Firm* — Muncy, Geissler, Olds & Lowe, P.C.

(57) ABSTRACT

A method for planning the design of partitions for a programmable gate array comprising different types of logic blocks of predetermined position, and a plurality of program routines comprising at least one first program routine and at least one further program routine. A mapping of a first partition of the programmable gate array with the first program routine and at least one further partition of the programmable gate array with the at least one further program routine is performed. The need of the first program routine for the individual types of logic blocks is determined. Meeting this need with the logic block resources of corresponding type available in the first partition. At least one logic block of corresponding type from the further partition or at least one of the further partitions into the first partition is transferred.

13 Claims, 6 Drawing Sheets

(56) References Cited

OTHER PUBLICATIONS

Extended European Search Report for European Application No. 20157861.4 dated Aug. 21, 2020 with English translation.

Sureschwar Raja Gopalan, "Timing-Aware Automatic Floowplanning of Partially Reconfigurable Designs for Accelerating FPGA Productivity," Thesis, Virginia Polytechnic Institute and State University, pp. 1-89 (2010).

Chu et al., "Nonrectangular Shaping and Sizing of Soft Modules for Floorplan-Design Improvement," IEEE Trans. on Comp-Aided Design of Integrated Circuits and Systems, vol. 23, No. 1, pp. 71-79 (Jan. 1, 2004).

Walder et al., "Non-preemptive Multitasking on FPGAs: Task Placement and Footprint Transform," at http://citeseer.ist.psu.edu/walder02nonpreemptive.thml, pp. 1-7 (Jun. 1, 2002).

\* cited by examiner

METHOD, COMPUTER-BASED SYSTEM AND COMPUTER PROGRAM PRODUCT FOR PLANNING PARTITIONS FOR A PROGRAMMABLE GATE ARRAY

This nonprovisional application claims priority under 35 U.S.C. § 119(a) to European Patent Application No. 20157861.4, which was filed in Europe on Feb. 18, 2020 and which is herein incorporated by reference.

BACKGROUND OF THE INVENTION

Field of the Invention

The present invention relates to a method for planning the design of partitions for a programmable gate array comprising different types of logic blocks of predetermined position and for a plurality of program routines, comprising at least one first program routine and at least one further program routine. The invention further relates to a computer-based system and computer program product for performing such a method.

Description of the Background Art

A so-called Field Programmable Gate Array (FPGA) is an integrated circuit in the form of a programmable gate array that contains digital function blocks with logic blocks that can be programmed and interconnected by the user. Corresponding program routines then specify an FPGA design, i.e. a design of partitions for the respective program routine. The associated development of an FPGA design is also referred to as "floorplanning". One aspect of this floorplanning is the planning of the design of corresponding partitions with a given number and position of logic blocks of different types of the programmable gate array.

Typically, the development of an FPGA design is incremental. If the FPGA resource demand of a program logic increase in a development step, so that an enlargement of the partition is necessary, the existing floor plan is generally invalidated and a completely new build of the FPGA must be carried out. This makes the development process enormously time-consuming.

An example for such an incremental development of an FPGA design is the abstracting FPGA development environment "FPGA Programming Blockset" and corresponding hardware boards of the applicant dspace, which enable a user to develop their own hardware even without detailed knowledge about FPGAs and Toolflows. Model-based, the user can create FPGA designs, implement them and run them on corresponding hardware. Regular changes to the FPGA model with subsequent rebuild are a natural part of the development process (e.g. in Rapid Control Prototyping).

The problem with rebuilding an FPGA is the very long build times, which are often in the range of hours. As FPGAs become more and more complex and provide more resources (registers, logic, DSP blocks, memory), the build times become greater and greater. This can only be partially compensated by better build algorithms (e.g. placement and routing) and faster computers. Currently, it is common to rebuild the complete FPGA for the smallest change.

FPGA tool manufacturers offer approaches to the problem of long build times, such as the "Hierarchical Design Flow". In this hierarchical design, the overall model is divided into parts for which regions in the FPGA are then exclusively reserved. In this way, for example, the construction process of the model parts can be distributed to several computers in parallel and accelerated. In addition, already implemented parts that have not changed during a build can be reused. The patent specification U.S. Pat. No. 9,870,440 B2 describes such a procedure, which is incorporated herein by reference.

An essential aspect here is the creation of the floor plan, which determines the regions of the partial models in the FPGA, which can then be built independently and in parallel. Here, it must be noted that each partial model is provided with enough logic block resources. In addition to the actual logic blocks (CLBs) as resources, there are also dedicated logic blocks, such as RAMs or DSPs. However, these are usually present in significantly smaller numbers and are distributed non-homogeneously across the FPGA. This results in a complex floorplanning problem which, in addition to the resource requirements of the individual partial models, must also take into account the distance of the modules and thus the length of the communication lines between the partial models.

SUMMARY OF THE INVENTION

It is therefore an object of the present invention to provide a method for designing partitions of a programmable gate array as well as a system and a computer program product for carrying out this method, which enable a reduction in the build times, in particular during a rebuild, of a programmable gate array.

In the method according to an exemplary embodiment of the invention for planning the design of partitions for a programmable gate array comprising different types of logic blocks of predetermined position and a plurality of program routines, which comprises at least one first program routine and at least one further program routine, the following method steps are provided: providing a mapping of a first partition of the programmable gate array to the first program routine and at least one further partition of the programmable gate array to the at least one further program routine, wherein these partitions are separated from each other by a current partition boundary (S1); determining a need of the first program routine for the individual types of logic blocks; meeting this need with the resources of logic blocks of corresponding type available in the first partition; and/or selecting and transferring at least one logic block of corresponding type from the further partition or at least one of the further partitions into the first partition by changing the course of the partition boundary between these partitions, if the need of the first program routine for logic blocks of this type exceeds the corresponding resources of the first partition, wherein the partition boundary runs sinuously in at least one section before and/or after changing its course.

This manner of transferring logic blocks by changing the course of the partition boundary results in new possibilities of planning (new floorplanning NFP). In order to utilize these possibilities particularly efficiently, it requires only a skillful selection of the logic blocks to be transferred and appropriate possibilities with the change of the course of the corresponding partition boundary.

According to the invention, the partition boundary is not simply shifted while retaining its previous, in particular linear, course. Due to the transfer of the at least one logic block, the partition boundary has a meandering course, at least in sections. Such a sinuous course is characterized by loops and is anything but linear. At least one loop forms a protrusion of the first partition into the or one of the further partition(s). The transferred logic block or at least one of the transferred logic blocks is then located in this protrusion. It is advantageously provided that the partition boundary has a less linear course due to the transfer of the at least one logic block than before the transfer.

In particular, the method is a computer-implemented method.

In the method, it is particularly provided that a selection of the logic blocks to be transferred via a weighted distance function of the distance of the respective logic block depends on the current course of the partition boundary. Such a weighted distance function is realized in particular via a gradient matrix.

According to an exemplary embodiment of the invention, it is provided that during the transfer of the corresponding logic blocks from the further partition to the first partition, those logic blocks are preferred which are close to the current course of the partition boundary of the first partition.

A successive transfer can be provided of individual logic blocks from border regions of the further partition or at least one of the further partitions immediately adjacent to the partition boundary into the first partition until the need for additional logic blocks in the first partition is met.

In this context, it is preferred that for each individual transfer, those border regions are given preference in which at least two of the required logic blocks are present in the highest possible spatial density.

The selection/identification of the next logic blocks to be transferred on the area of the further partition can be done using a two-dimensional selection function created in the following way:

Creation of a distribution function for each type of required logic blocks on the area of the further partition. The distribution function is an additive superposition of delta distributions with a delta peak at each position where a logic block of the respective searched type is deposited on the area of the further partition.

Creation of a density function for each type of required logic blocks by convolving the distribution function with a distance function.

The distance function is characterized by the fact that it has a global maximum at the reference point (0, 0) and falls strictly monotonically in each direction with increasing distance from the position (0, 0). A suitable distance function is, for example, a Gaussian normal distribution. As a result of the convolution operation, the density function is a superposition of many distance functions, e.g. many Gaussian normal distributions, whose maxima in each case locationally identical with a logic block of the respective searched type. A large function value of the density function at a certain position means that at said position there is a high density of the respective logic blocks searched for, i.e. that at least one of the logic blocks searched for is located in the immediate vicinity.

Creation of a gradient function on the area of the partition to be stolen, which has its maximum at the previous partition boundary and slopes strictly monotonically downwards towards the opposite boundary.

Creation of the selection function by multiplying all created density functions and the gradient function.

The selection function is represented, for example, as a matrix, wherein each matrix element of this matrix represents a logic block on the partition and the value of each entry represents the value of the selection function at the corresponding position. Thereby, it is alternatively possible that the transfer is performed at the end or that all functions are represented as matrices from the beginning and the representation of the selection function as a matrix is performed by element-wise multiplication (Hadamard product).

A mathematical convolution is graphically a function which, depending on a shift of two functions against each other, specifies their degree of superposition. (See, for example, the Wikipedia entry "Convolution (mathematics)").

Advantageously, it is provided that providing the mapping between the respective partition and program routine in step (i) is dividing the area of the programmable gate array into these partitions.

Further, a third type of logic blocks and a third resource distribution function are provided. The total resource distribution function is the product of gradient function, first resource distribution function, second resource distribution function, and third resource distribution function.

It is also provided that at least one of the different types of logic blocks can be a type from the following list of types:
CLB type (CLB: Configurable Logic Block),
DSP type (DSP: Digital Signal Processing) and
RAM type (RAM: Random Access Memory).

These types of logic blocks are quite typical for FPGA.

Finally, with regard to this method it is advantageously provided that for planning the design of the further partitions it is proceeded analogously to the above-mentioned method, wherein one of these further partitions is regarded as the first partition and the associated program routine as the first program routine. In this way, the configuration of all partitions is carried out incrementally.

The invention further relates to a method for planning a programmable gate array comprising different types of logic blocks of predetermined position for a plurality of program routines, which comprises at least one first program routine and at least one further program routine, wherein partitions are designed for the program routines. It is provided that the designing of the partitions is performed by means of the aforementioned method for planning the designing of partitions for a programmable gate array. The method may also be referred to as a floorplanning method and is in particular a computer-aided method. In addition to the designing of the partitions, this method also includes the planning of the linking of the logic blocks.

In other words, this method describes the use of the above method for planning the design of partitions for planning the programmable gate array comprising different types of logic blocks of predetermined position as a whole.

The method can be an incremental method.

It is provided that the computer-based system having a processing unit is adapted to perform the above method.

In the computer program product, it is provided that it comprises program parts loaded in a processor of a computer-based system arranged to perform the above method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
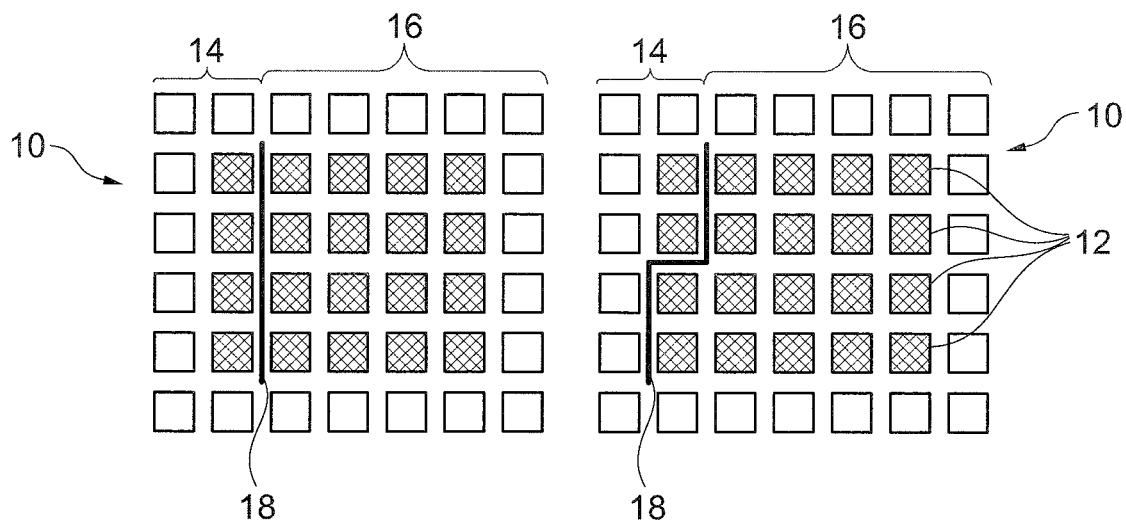
FIG. 1 shows a partial area of a programmable gate array designed as an FGPA.

FIG. 1 shows, on the left as on the right, a partial area of a programmable gate array 10 designed as an FGPA (FGPA: Field Programmable Gate Array). Logic blocks 12 are arranged on the partial area shown according to a predetermined structure. The logic blocks shown here in the example are CLBs (CLB: Configurable Logic Block). CLB is one of several types of logic blocks 12 typically used in programmable gate arrays 10.

If the programmable gate array 10 is now to be used for a plurality of program routines, it must be divided into different partitions 14, 16. In the following, we will speak of a first partition 14 and at least one further partition 16. The division takes place dynamically, is thus changeable. This division results in a corresponding partition boundary 18 between the first and the further partition 14, 16. The change of dividing into partitions 14, 16 is made by changing the course of the partition boundary 18 between these partitions 14, 16. In FIG. 1, the left side shows the current course of the partition boundaries 18 before the corresponding change of its course, and the right side shows the course of the partition boundaries 18 after the corresponding change of the course of the partition boundary 18.

Figure 2:
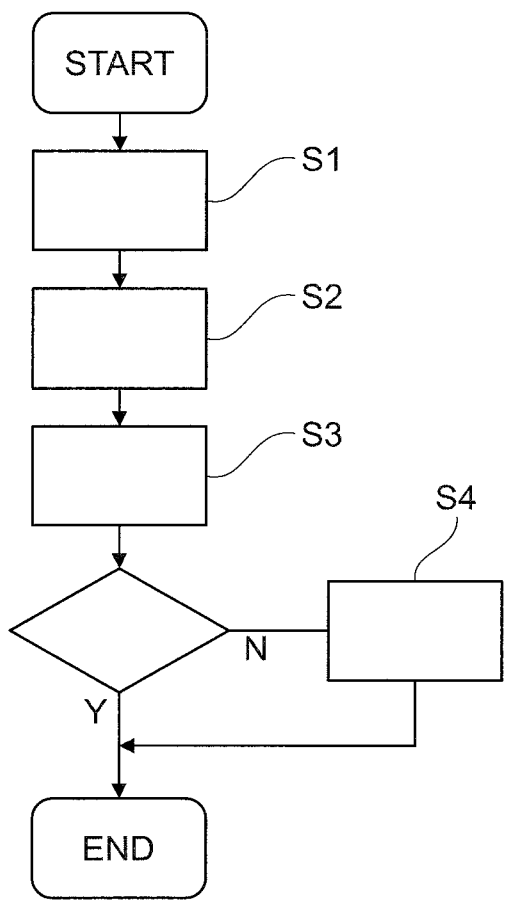
FIG. 2 shows a flow chart of a method for planning the design of partitions for a programmable gate array according to a preferred embodiment.

FIG. 2 shows a program flow chart of a method for planning the design of partitions for the programmable gate array 10. This programmable gate array 10 has several different types of logic blocks 12 of predetermined positions.

The programmable gate array 10 is now to be scheduled for processing at least one first program routine and at least one other program routine. For this purpose, the following steps are processed:

Step S1: Providing a mapping of the first partition 14 to the first program routine and of the at least one further partition 16 to the at least one further program routine. For this purpose, it is common to divide the gate array 10 into contiguous spatial partitions 14, 16, the number of which is equal to the number of program routines.

Step S2: Determining a need of the first program routine for the individual types of logic blocks 12.

Step S3: Meeting this need with the logic block 12 resources of corresponding type available in the first partition 14.

Step S4: Transferring at least one logic block 12 of corresponding type from the further partition 16 or at least one of the further partitions into the first partition 14 by shifting the partition boundary between these partitions 14, 16, if it is determined that the need of the first program routine for logic blocks 12 of this type exceeds the corresponding resources of logic blocks 12 of the first partition 14.

In the following, the course of action will now be discussed using the example of a floor plan for an FPGA sub-area, although the above-mentioned also applies to any other type of programmable gate array 10.

The basic procedure of how to achieve a speed advantage by subdividing a (user) model and the hierarchical design flow is described in the patent specification U.S. Pat. No. 9,870,440 B2 mentioned above and will therefore not be explained further here. The core object of the present invention is to find a suitable floor plan in the FPGA in order to be able to implement as many partial models (program routines) as possible in parallel. Provided are therefore a set of partial models/modules or program routines and an FPGA or an FPGA sub-area. The result should be a floor plan that fulfills the following criteria for each partial model as optimally as possible:

Required logic cells/CLBs of a partial model must be provided;

Required memory/RAMs of a partial model must be provided;

Required DSP requirement of a partial model must be provided;

The waste of resources on logic blocks 12 (CLBs, RAMS, DSPs) should be as small as possible;

The shapes of the FPGA regions should be as balanced as possible (e.g., square or slightly rectangular, no extreme shapes) so that the line lengths and thus the signal propagation times and the maximum clock frequency within a partial model are not unnecessarily negatively affected; and The number and the line lengths between the modules must be kept as short as possible.

A classic method for creating a floorplan or for placing gates in VLSI circuits (Very-Large-Scale Integration) is bi-partitioning. For this purpose, the available area is divided into two halves and the modules, e.g. in all combinations, are distributed over the two areas and the result is evaluated using an evaluation function. The evaluation function can reflect different criteria for an acceptable distribution of modules, e.g., the lowest possible number of communication lines crossing the partition boundaries or the most even distribution of resources among the partitions. Then, in each of the two halves, the area is recursively divided into two halves again until only one module remains in each partition.

Figure 3:
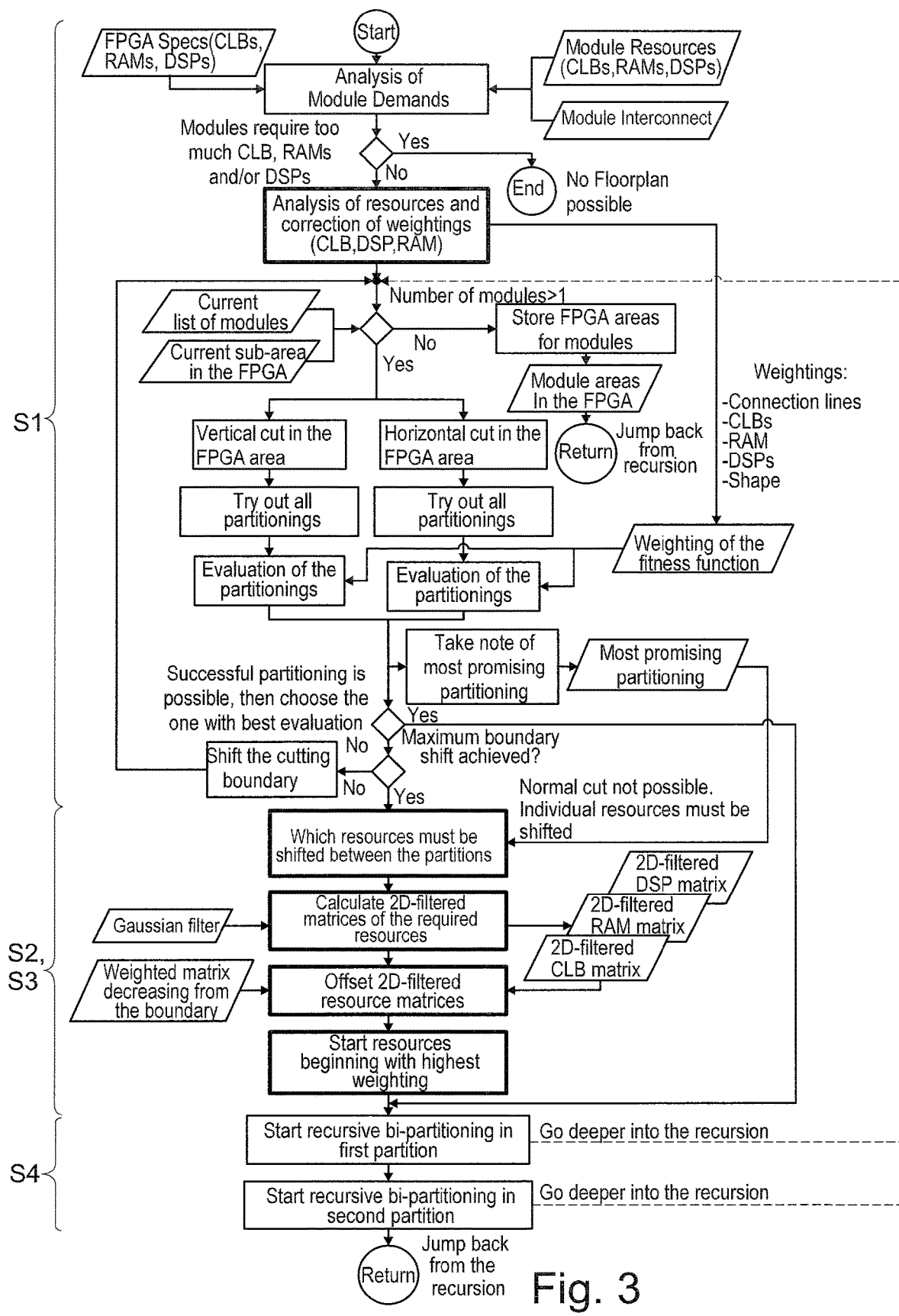
FIG. 3 shows a rough flow chart of a floorplanning process.

FIG. 3 shows the rough procedure of floorplanning, i.e. the planning of a programmable gate array for a plurality of program routines. As a first step, the FPGA size and the sum of all program routines or corresponding modules for these program routines are analyzed to find out whether the partial models/modules corresponding to the program routines fit into the FPGA at all with respect to the resources (logic blocks: CLBs, RAMs, DSPs). At this point, shortages are also directly analyzed, which can later flow into the evaluation function of a partitioning/placement and the transfer ("stealing") of resources from further partitions 16 in the form of variable weights. For example, if the sum of all RAM and DSP requirements of the partial models/modules is close to the total amount of the FPGA, the uniform distribution of RAMs and DSPs in a partitioning/bi-partitioning is to be evaluated higher than the uniform distribution of CLBs, which may be available in abundance.

If the required module resources are generally less than those of the FPGA, an initial partitioning of the FPGA area can be performed. Here, first a horizontal cut is performed and then all n modules in all 2n-1-1 combinations are distributed to the two partitions and the result is evaluated (see FIG. 3). In the formula, -1 is written because the case all modules in one partition is not a meaningful result. The combinations are given by m modules in partition 1 and n-m modules in partition 2, respectively, for all $m \in \{1 \ldots (n-1)\}$. The horizontal cut is rescinded and the evaluation is repeated for the vertical cut through the area.

In particular, with many modules, the calculation time increases strongly due to the high number of possible module combinations per partitioning step. There are various methods to reduce this (e.g. heuristics, such as Nonlinear Integer Programming (NLP)), so this will not be further discussed here. In our cases, we always assume a small number of modules, e.g., equal to the number of subsystems in the top-level customer model, so that all combinations can be tried. This takes only a few seconds.

After the FPGA has been cut both horizontally and vertically in the middle, it is checked which cut (horizontal or vertical) and which partitioning of the modules has received the best evaluation. For this purpose, there is an evaluation function/fitness function that takes into account the criteria from above (uniform CLB distribution, etc.). The best partitioning is stored towards the end of a first program part (compare "Take note of most promising partitioning"). If a correct partitioning was found, the two resulting partitions are recursively divided according to the above scheme until only one module per partition 14, 16 remains and thus the floor plan area for the module is found.

In many cases, however, a simple cut in the middle does not work, so the cutting boundary is moved if necessary until placement of the given modules is possible (see "Shift the cutting boundary" in FIG. 3). However, in many cases, even with the boundary moved, placement is not possible. This is simply because a given set of modules may fit onto a given FPGA area purely by calculation, but since, as shown above, only straight horizontal/vertical cuts can be made, it may not be possible to actually place the modules.

The already mentioned FIG. 1 illustrates such an example. Two modules are to be placed on an FPGA subarea of 5×4=20 CLBs. One module requires 18 CLBs, another 1 CLB. So, purely mathematically, the two modules fit into the FPGA sub-area. However, no partitioning is possible with straight cuts. The left part of FIG. 1 shows the best possible cut (4 CLBs to 16 CLBs). On the other hand, if one can "steal", i.e., transfer, individual CLBs, partitioning is possible (shown on the right). This is a very simple example, but it becomes much more complex if, in addition to the CLBs, the non-homogeneously distributed RAMs and DSP must also be taken into account. In particular, with a high utilization of the FPGAs, one usually does not get a complete FPGA floor plan with the simple bi-partitioning and also with the bi-partitioning with boundary shifting alone.

Therefore, in the flowchart of FIG. 3, starting from "Maximum boundary shift achieved", the mapping according to step S1 of the procedure of FIG. 2 is present. In this branch, the purely computational number of logic blocks 18 of the different types (here: CLBs, RAMs and DSPs) of the FPGA area is greater than or equal to the sum of the resources of the modules, but placement is still not possible (not even with boundary shift). In this case, individual resources must be transferred ("stolen") from the adjacent partition 16. To minimize the overlap of adjacent partitions 14, 16, it is important to transfer logic blocks of the appropriate type that are close to the boundary 18. If multiple types of logic blocks 12 are scarce, e.g., CLBs and RAMs, then they should also be as close together as possible so that the partition's routing resources do not have to be used in multiple places by the other partition. For example, it must be avoided that CLBs are transferred from one corner and RAMs from a completely different corner.

Figure 4:
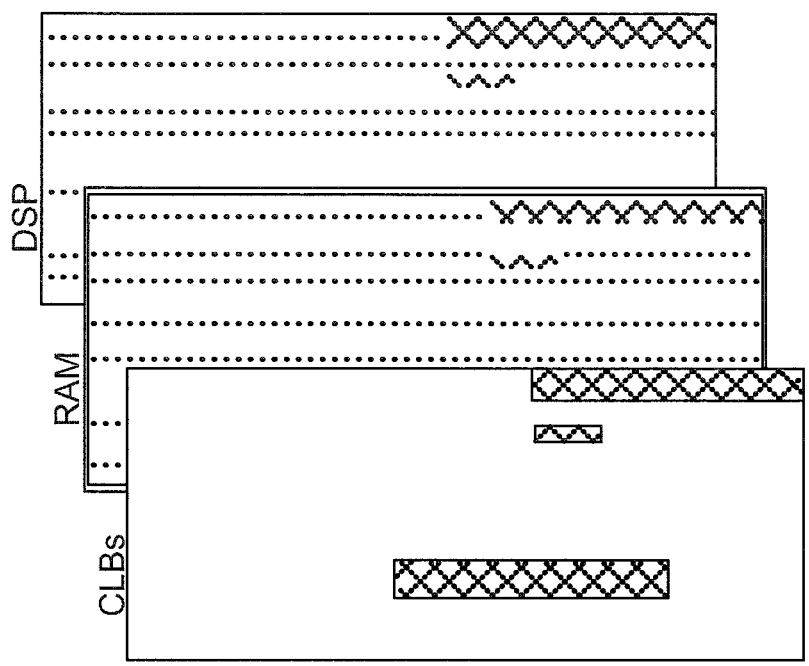
FIG. 4 shows a programmable gate array designed as an FGPA, divided according to logic block types.
Figure 4:
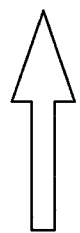
Figure 4:
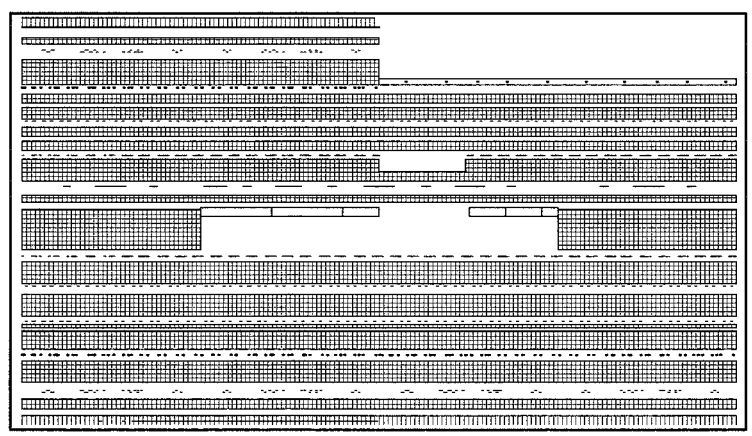

In order to be able to process this in a data-technical manner, the resources are modeled as separate layers in the form of matrices. The right side of FIG. 4 shows an example of the three resource layers.

Figure 5:
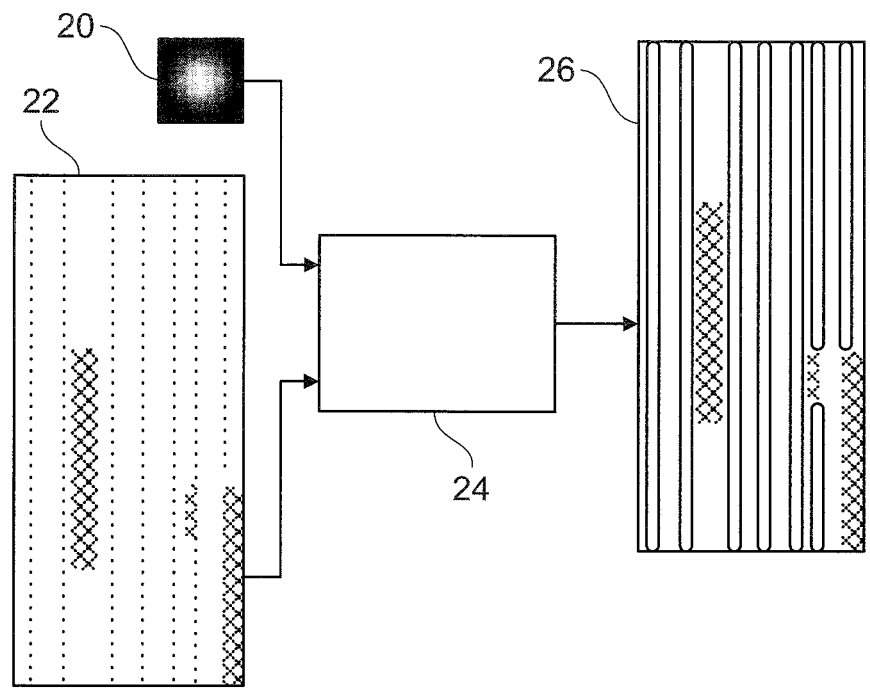
FIG. 5 shows a schematic representation of a 2D convolution of RAM resources with a Gaussian filter.
Figure 6:
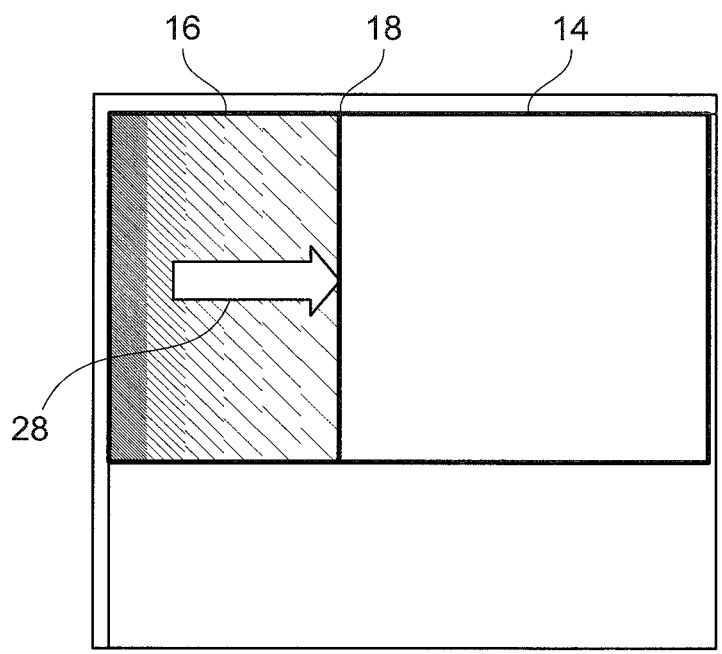
FIG. 6 shows a section of the programmable gate array designed as an FGPA.
Figure 7:
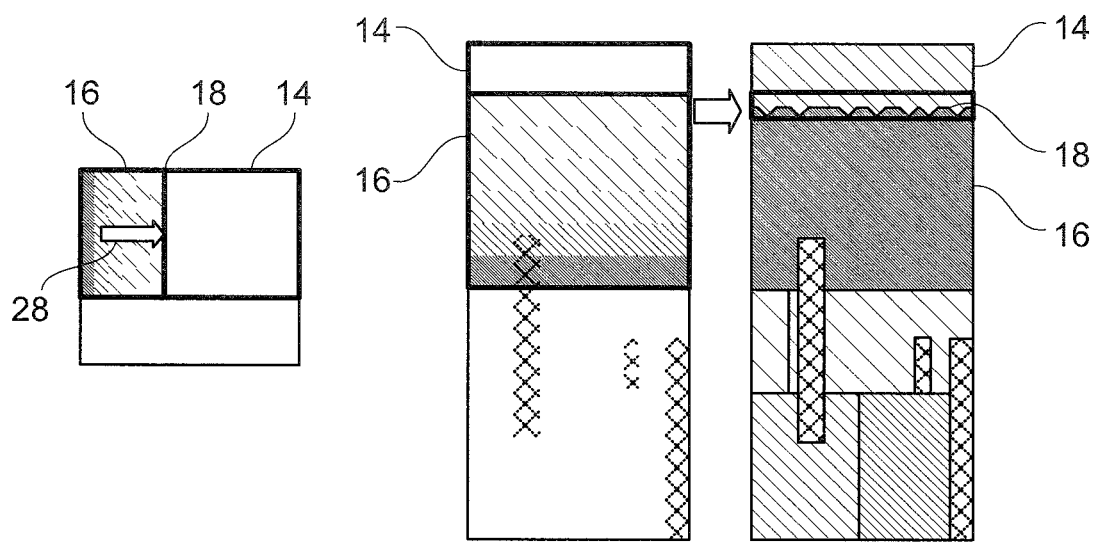
FIG. 7 shows on the left: Example of a gradient matrix; center: Horizontal division of the upper half of an FPGA with the resource matrix calculated from CLB, RAM and gradient matrix; and shows on the right: the transferred resources from another partition.

Next, the critical resource matrices are subjected to a 2D convolution with a filter (e.g., Gaussian filter) 20 to give the individual resource logic blocks a larger area of influence in their matrix. FIG. 5 shows this in a schematic diagram. Here, a distribution of available logic blocks 22 (e.g., available FPGA RAMs) is transferred into a corresponding distribution of 2D-filtered logic blocks 26 using said Gaussian filter 20 via 2D convolution 24. To give greater weight to the resources near the boundary of the further partition 16, an additional matrix is generated which applies a weighting decreasing from the boundary 18—see FIG. 6 with gradient (arrow 28). Subsequently, all required 2D filtered resource matrices CCLB, RRAM, DDSP and the gradient matrix G are computed together (see left part of FIG. 7). The calculation of the resulting matrix S for the partition from which resources are to be "stolen" (visualized as another partition 16 in FIG. 7) is thereby performed by the element-wise multiplication of the matrices (Hadamard product) including the scalar weighting according to the formula below. Wherein the scalars $\alpha, \beta, \gamma$ are respectively either 0 (resources are not needed) or 1 (resources are needed).

$$S = G \circ (\alpha \cdot CCLB) \circ (\beta \cdot RRAM) \circ (\gamma \cdot DDSP)$$

After the 2D-filtered resource matrices and the gradient matrix have been offset against each other, it is only necessary to gradually assign the required resources with the highest value to the other partition. In this way, it is possible to create floorplans that would not be possible with simple bi-partitioning.

Figure 8:
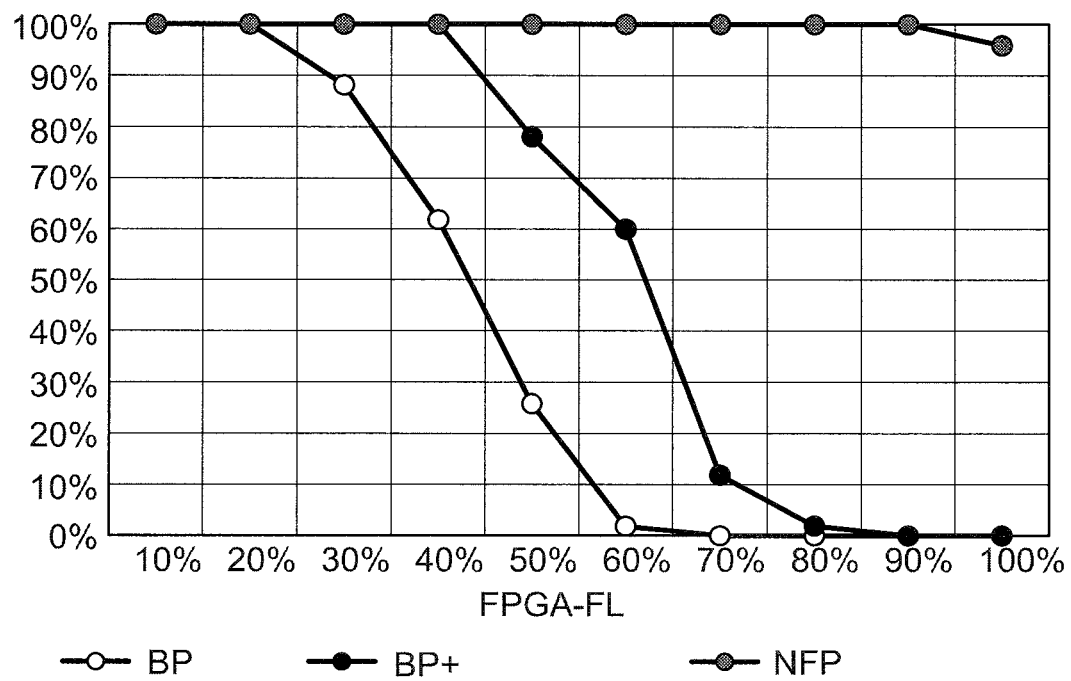
FIG. 8 shows a graphical illustration of test series on the placement efficiency of the new floorplanning process.

The efficiency of the method was examined in test series with 1500 placements (50 resource distributions each with 10%, 20% ... 90% to 100% FPGA fill level, for each of the three strategies). A fill level of 50% here means that the sum of the module CLBs occupy 50% of the FPGA. The same is true for RAM and DSPs. The results for the three placement strategies are shown in FIG. 8. It can be clearly seen that the pure bi-partitioning strategy (BP) already collapses significantly at a fill level of 30%. The bi-partitioning strategy with boundary shift (BP+) can still place all modules up to a FPGA fill level of approx. 40%, but collapses thereafter. Only the new method (NFP: new floorplanning) can reach 100%.

In the following, the transformation of the matrix-based floorplan into FPGA notation will be discussed.

The presented algorithm provides the floor plan of the FPGA in the form of a matrix as a result. In this case, the elements of the matrix each have the value of the module number of the module assigned to them. The partitions 14, 16 for the individual modules are thus easily identifiable (also visually) (cf. FIG. 7 right).

In the FPGA tools, the partitioning of the FPGA area is usually done with a different coding. It is usual to compose the partitions from rectangles, which in the case of Xilinx FPGAs are called Pblocks. Since the number of Pblocks affects the performance when transferring the floor plan, the goal here is to keep the number of Pblocks as low as possible. For this reason, the transformation of the matrix partitions into Pblock partitions is based on the "maximum rectangle algorithm" (D. Vandevoorde), which finds the largest possible rectangle in a given area. For the transformation, the algorithm is applied iteratively in this message until the entire area of a partition 14, 16 is represented by rectangles (Pblocks).

Figure 9:
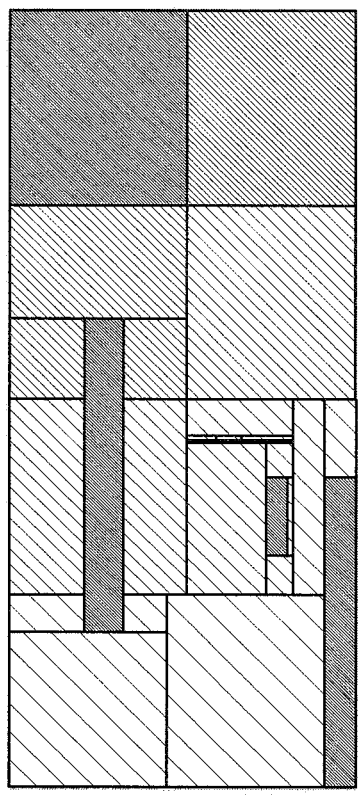
FIG. 9 shows a decomposition of a found floor plan into rectangles.

FIG. 9 shows a decomposition of a found floor plan into rectangles. Several rectangles can belong to one partition 14, 16.

Since the development process of an FPGA model goes through several iterations, it has already been described in the patent specification U.S. Pat. No. 9,870,440 B2 mentioned above that, in the case of a subsequent build of the FPGA application, an analysis is first carried out to determine whether the existing floor plan can still be used for the possibly changed module sizes or the changed number of modules. It is desirable to reuse the existing floor plan as much as possible, since unchanged modules do not have to be rebuilt if their partition remains unchanged. This reduces the build time.

To prevent the creation of a new floor plan, the following measures can be taken in advance:

If there are enough reserves in the FPGA, a partition of size p with $p \in \{0 \ldots \text{(FPGA resources--resources of all modules)}\}$ can be reserved during initial floorplanning as a placeholder for the partitions of future modules.

Prior to the initial floor plan, the required resources of all modules are multiplied with a factor r with $i.r \in \{1 \ldots \text{FPGA resources/resources of all modules}\}$ so that the resulting partitions provide a reserve for all modules.

In retrospect, the following measures can be taken:
Accommodation of New Modules Partitions of modules that are no longer used can, if they are adjacent to each other, first be combined and then used for new modules if there no longer is a spare partition.

Enlargement of Existing Partitions

For this purpose, the initial floorplanning algorithm can keep the partitions and perform only the steps of moving partition boundaries and "stealing" resources in modules whose resource requirements have outgrown their partition resources. In this process, resources are claimed by other partitions with the following priority:

Neighboring Partition, No Longer Used

Neighboring partition with the most reserves or the shortest rebuild time (but only if this means that several modules do not have to be rebuilt)

Neighboring partitions of neighboring partitions that can still be well connected by routing.

In a first step, the actually used resources of the already placed modules in the partitions from which resources are to be claimed can be masked out in the resource matrices (CLB, RAMs, DSP).

As a result, only the resources that are actually still free are used by the floorplanning method presented. The modules reduced in this way do not have to be rebuilt.

If this does not lead to a result, masking can be dispensed with in a second step. This makes more potential resources available at the boundary of the claiming partition. However, the module from which resources were claimed must be rebuilt in its reduced partition.

If shifting the partition boundaries and "stealing" resources does not lead to success, a completely new floor plan can be created.

This allows for the overall resource situation to be reassessed and the weighting functions presented lead to a better overall floor plan for the new situation.

Use of Floorplanning in Sub-Areas of FPGAs

Figure 10:
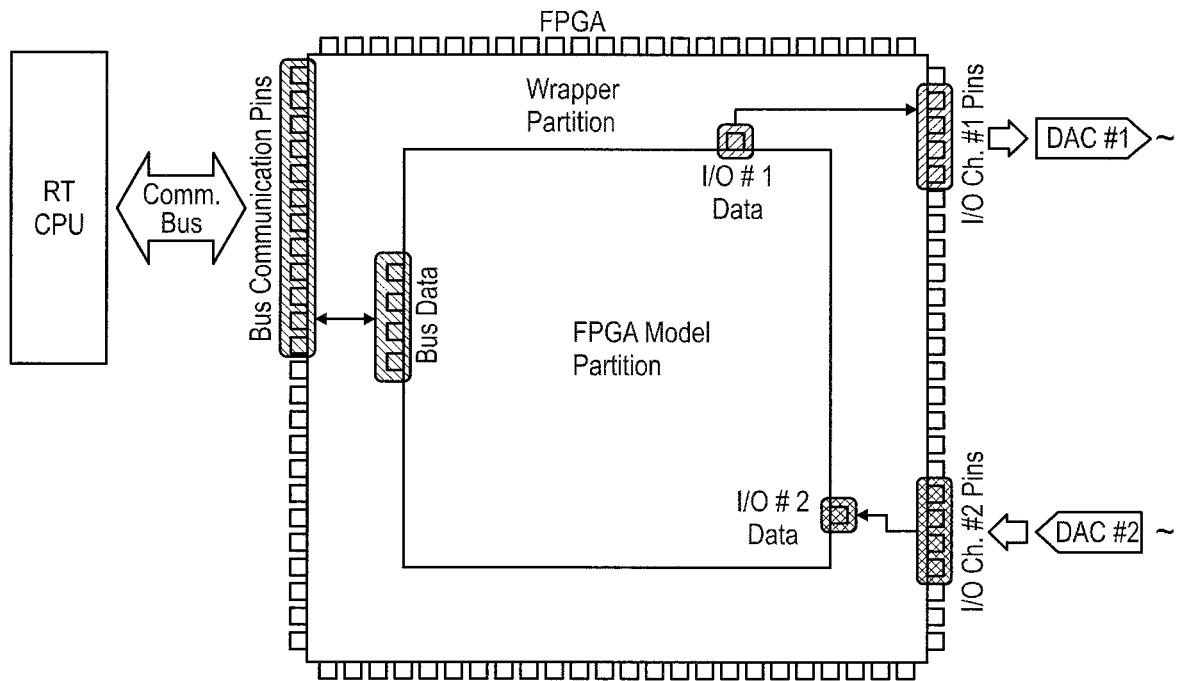
FIG. 10 shows a programmable gate array designed as an FGPA, with a wrapper partition and an FPGA model partition to which floorplanning can be applied for the modularized build process.

The presented floorplanning and update of the floorplan can be transferred 1:1 from the planning of the total FPGA area to a sub-area. This is important because often the entire area of an FPGA is not available for free customer modeling. In the case of the dSPACE FPGA Programming Blockset, for example, the customer model is embedded in a VHDL wrapper that provides a fixed interface between the customer model on one side and the processor bus and dSPACE I/O channels on the other. In this case, the wrapper takes over the complete connection of the customer model to the outside world and must therefore be placed in the region of the FPGA where the I/O drivers for the FPGA pins are located (see FIG. 10). In general, several wrappers in the FPGA are also conceivable. To reduce the waste caused by the wrappers, the resources occupied by the wrappers and the used components of the "component stack" can be marked as occupied when floorplanning the Pblocks.

In the following, important elements of the invention will be recapitulated in key points:

Dynamically adjust the weighting function to the prevailing shortage. For example, RAMs are critical because the sum of all module requirements is close to the limit of FPGA RAMs, whereas CLB and DSP are relaxed, then the weighting is adjusted accordingly so that more attention is paid to the scarce resources when evaluating/selecting placements.

Method at which points resources are extended to the other region

Simple bi-partitioning often does not work, otherwise too many resources remain unused Determination of missing resources (e.g. CLBs and RAMs).

Resource Matrices are convolved with a filter function (e.g. Gaussian filter 20).

Creation of a Gradient Matrix

Offsetting of the filtered resources with the gradient matrix.

"Stealing" individual resources so that the partitions 14, 16 are changed as "minimally invasively" as possible by "stealing" the highest rated resources first.

Method of updating a floorplan in which, when regions expand into another region, the module of the reduced region does not have to be rebuilt.

The floorplanning can be combined with additional wrappers as well as the "component stack" method in an FPGA by masking the resources of these already occupied areas in the resource matrices for floorplanning.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for planning the design of partitions for a programmable gate array comprising different types of logic blocks of a predetermined position, and a plurality of program routines comprising at least one first program routine and at least one further program routine, the method comprising:
- providing a mapping of a first partition of the programmable gate array with the first program routine and at least one further partition of the programmable gate array with the at least one further program routine, the first and at least one further partitions being separated from each other by a current partition boundary;
- determining a need of the first program routine for the individual types of logic blocks;
- meeting the need with the logic block resources of a corresponding type available in the first partition; and
- selecting and transferring at least one logic block of the corresponding type from the further partition or at least one of the further partitions to the first partition by changing a course of the partition boundary between these partitions if the need of the first program routine for logic blocks of this type exceeds the corresponding resources of the first partition such that the partition boundary is sinuous in at least one section before and/or after changing its course.

2. The method according to claim 1, wherein, when transferring the at least one corresponding logic block from the further partition into the first partition, such a logic block is selected, which, as compared to at least one other logic block of corresponding type, is closer to the current partition boundary between these partitions.

3. The method according to claim 1, wherein a selection of the logic blocks to be transferred depends on the current course of the partition boundary via a weighted distance function of the distance of the respective logic block.

4. The method according to claim 3, wherein such a weighted distance function is realized via a gradient matrix.

5. The method according to claim 1, further comprising: successively transferring individual logic blocks from boundary regions of the further partition directly adjacent to the partition boundary or at least one of the further partitions into the first partition until the need for additional logic blocks in the first partition is met.

6. The method according to claim 5, wherein, for each individual transfer, preference is given to those boundary regions in which at least two of the required logic blocks are present in the highest possible spatial density.

7. The method according to claim 1, wherein, for selecting the logic block to be transferred next, a two-dimensional selection function is created by:
- creating a distribution function of the logic block distribution as a superposition of delta functions, with a delta peak wherever a corresponding logic block is stored;
- generating a density function by convolution of the distribution function with a distance function or a Gaussian function, the distance function being characterized by the fact that it has a global maximum at its reference point and falls strictly monotonically in each direction with increasing distance from this point;
- establishing a gradient function on the area of the further partition which has its maximum at the current partition boundary and slopes strictly monotonically in the direction of the center of the further partition; and
- creating the selection function by multiplying all created density functions and the gradient function.

8. The method according to claim 1, wherein at least one of the different types of logic blocks is a: Configurable Logic Block type, Digital Signal Processor type, or Random Access Memory Type.

9. The method according to claim 1, wherein, for planning the design of the further partitions, one of these further partitions is regarded as the first partition and the associated program routine is regarded as the first program routine.

10. A method for planning a programmable gate array comprising different types of logic blocks of predetermined position for a plurality of program routines, the method comprising:
- providing at least one first program routine and at least one further program routine;
- designing partitions for the program routines; and
- performing the designing of the partitions by the method according to claim 1.

11. The method according to claim 10, wherein the method is an incremental method.

12. A computer-based system comprising a processing unit, wherein the system is adapted to perform the method according to claim 1.

13. A computer program product comprising program parts, which are loaded in a processor of a computer-based system for performing the method according to claim 1.

* * * * *